(12) United States Patent
Shows

(10) Patent No.: US 6,427,411 B2
(45) Date of Patent: Aug. 6, 2002

(54) BUMPER FOR COLUMNS AND CORNERS

(76) Inventor: Randy E. Shows, 3427 NE. Rock Creek Dr., Kansas City, MO (US) 64116

(*) Notice: Subject to any disclaimer, the term of this patent is extended or adjusted under 35 U.S.C. 154(b) by 17 days.

(21) Appl. No.: 09/756,719

(22) Filed: Jan. 10, 2001

Related U.S. Application Data

(60) Provisional application No. 60/188,685, filed on Mar. 13, 2000.

(51) Int. Cl.$^7$ ................................................ B27K 1/00
(52) U.S. Cl. .......................... 52/515; D25/38; 180/270; 114/219
(58) Field of Search .............................. 293/1, DIG. 3; 152/310; 256/1; 114/219; 273/157

(56) References Cited

U.S. PATENT DOCUMENTS

| | | |
|---|---|---|
| 3,661,359 A | 5/1972 | Walker |
| 3,782,724 A | 1/1974 | Rottman et al. |
| 3,991,582 A | 11/1976 | Waldrop et al. |
| 4,022,452 A | 5/1977 | Dupre |
| 4,244,156 A | 1/1981 | Watts, Jr. |
| 4,378,749 A | 4/1983 | LeBlanc et al. |
| 5,924,513 A * | 7/1999 | Jones ..................... 180/270 |
| D435,301 S * | 12/2000 | Shows ..................... D25/38 |
| 6,349,661 B1 * | 2/2002 | Dusek ..................... 114/219 |

* cited by examiner

Primary Examiner—Carl D. Friedman
Assistant Examiner—Steve Varner
(74) Attorney, Agent, or Firm—Richard C. Litman

(57) ABSTRACT

A bumper and supporting frame assembly for protecting a column or a corner, or any object which may come in contact with the column or corner. The invention includes tires having hubs or wheels rotatably mounted on a sleeve, i.e. a hollow tube. A pair of frames for mounting around a column, one above the tires and the other below the tires, support the tires in their position as bumpers to protect the column. The frames have tubular protrusions, e.g. pipes, extending towards one another and telescopically engaged. The sleeve is rotatably mounted on the pipes. Energy from an object which strikes the column is dissipated by this rotation of the sleeve relative to the pipes, as well as the rotation of the tires relative to the sleeve. Each frame includes two portions, which are removably attached to one another, allowing for the easy adjustment of the frames along a column. The adjustment of both frames allows for the height of the bumper to be varied on the column. The adjustment of one frame and the slidable relationship of the pipes, allows for a variation of the distance between frames and a corresponding change in the number of tires.

8 Claims, 3 Drawing Sheets

BUMPER FOR COLUMNS AND CORNERS

CROSS-REFERENCE TO RELATED APPLICATION

This application claims the benefit of U.S. Provisional Patent Application Ser. No. 60/188,685, filed Mar. 13, 2000.

BACKGROUND OF THE INVENTION

1. Field of the Invention

The present invention relates to a bumper for protecting a column or a corner.

2. Description of Related Art

Bumpers to protect poles and columns, as well as the objects hitting them, are well-known in the art. U.S. Pat. No. 3,782,724, issued on Jan. 1, 1974 to Joel Rottman et al., and U.S. Pat. No. 4,244,156, issued on Jan. 13, 1981 to Ridley Watts, Jr., teach the use of foam material for energy absorption. U.S. Pat. No. 3,661,359, issued on May 9, 1972 to Brooks Walker, and U.S. Pat. No. 4,022,452, issued on May 10, 1977 to Herman Dupre, teach automobile tires for absorbing impact. However, these tires are not rotatably mounted.

The bumper systems taught in U.S. Pat. No. 3,991,582, issued on Nov. 16, 1976 to Tom Waldrop et al., and U.S. Pat. No. 4,378,749, issued on Apr. 5, 1983 to Raymond Leblanc et al., use a plurality of rotatably mounted bumpers attached to a frame. However, the frame is not adjustable in that bumpers cannot be easily added or removed. Further, there is no adjustment means which allows the components of the frame to separate for easily positioning the bumper system on a column.

None of the above inventions and patents, taken either singly or in combination, is seen to describe the instant invention as claimed.

SUMMARY OF THE INVENTION

The instant invention is a bumper and supporting frame assembly for protecting a column or a corner, or any object which may come in contact with the column or corner. The invention includes tires having hubs or wheels rotatably mounted on a sleeve, i.e. a hollow tube. A pair of frames for mounting around a column, one above the tires and the other below the tires, support the tires in their position as bumpers to protect the column.

The frames have tubular protrusions, e.g. pipes, extending towards one another and telescopically engaged. The sleeve is rotatably mounted on the pipes. Energy from an object which strikes the column is dissipated by this rotation of the sleeve relative to the pipes, as well as the rotation of the tires relative to the sleeve.

The nature of this system, i.e. the rotational dissipation of energy, allows for work to continue uninterrupted due to a glancing blow from an object, e.g. a vehicle, to a column. The absorption of energy is a less destructive manner than other methods, e.g. crumple zones. Further, the rotation of the tires of the bumper system depends on the manner in which the bumper is hit, and the tires rotate such that the object continues in its original direction.

Each frame includes two portions, which are removably attached to one another, allowing for the easy adjustment of the frames along a column. The adjustment of both frames allows for the height of the bumper to be varied on the column. The adjustment of one frame and the slidable relationship of the pipes, allows for a variation of the distance between frames and a corresponding change in the number of tires. These adjustments may be needed depending on the type of equipment used around the column, e.g. a taller vehicle, or any other reason.

Accordingly, it is a principal object of the invention to provide a bumper that is effective in protecting columns.

It is another object of the invention to provide a system which absorbs the energy rotationally.

It is a further object of the invention to provide a system that can be easily detached, moved, or adjusted.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
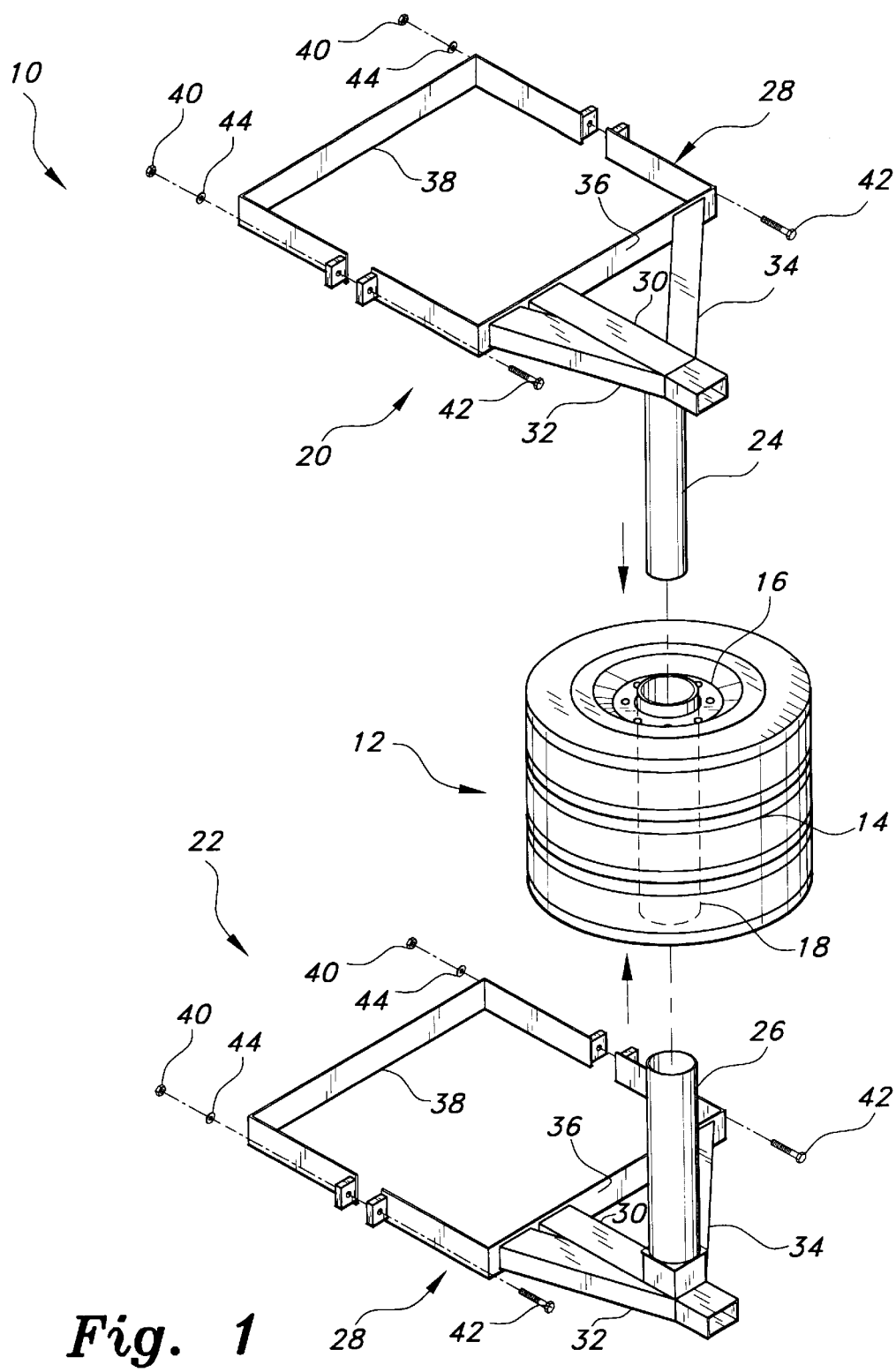
FIG. 1 is an exploded, perspective view of a bumper for columns and corners according to the present invention.

The present invention is a bumper and supporting frame assembly 10 for protecting a column 46 (seen in FIG. 3) or a corner, or any object which may come in contact with the column or corner. As seen in FIG. 1, the invention includes a bumper 12 having tires 14 having hubs or wheels 16 rotatably mounted on a sleeve 18, i.e. a hollow tube. An upper frame 20 and an identical lower frame 22 each mount around a column, one above the tires 14 and the other below the tires 14, and support the tires 14 in their position as bumpers to protect the column.

Figure 2:
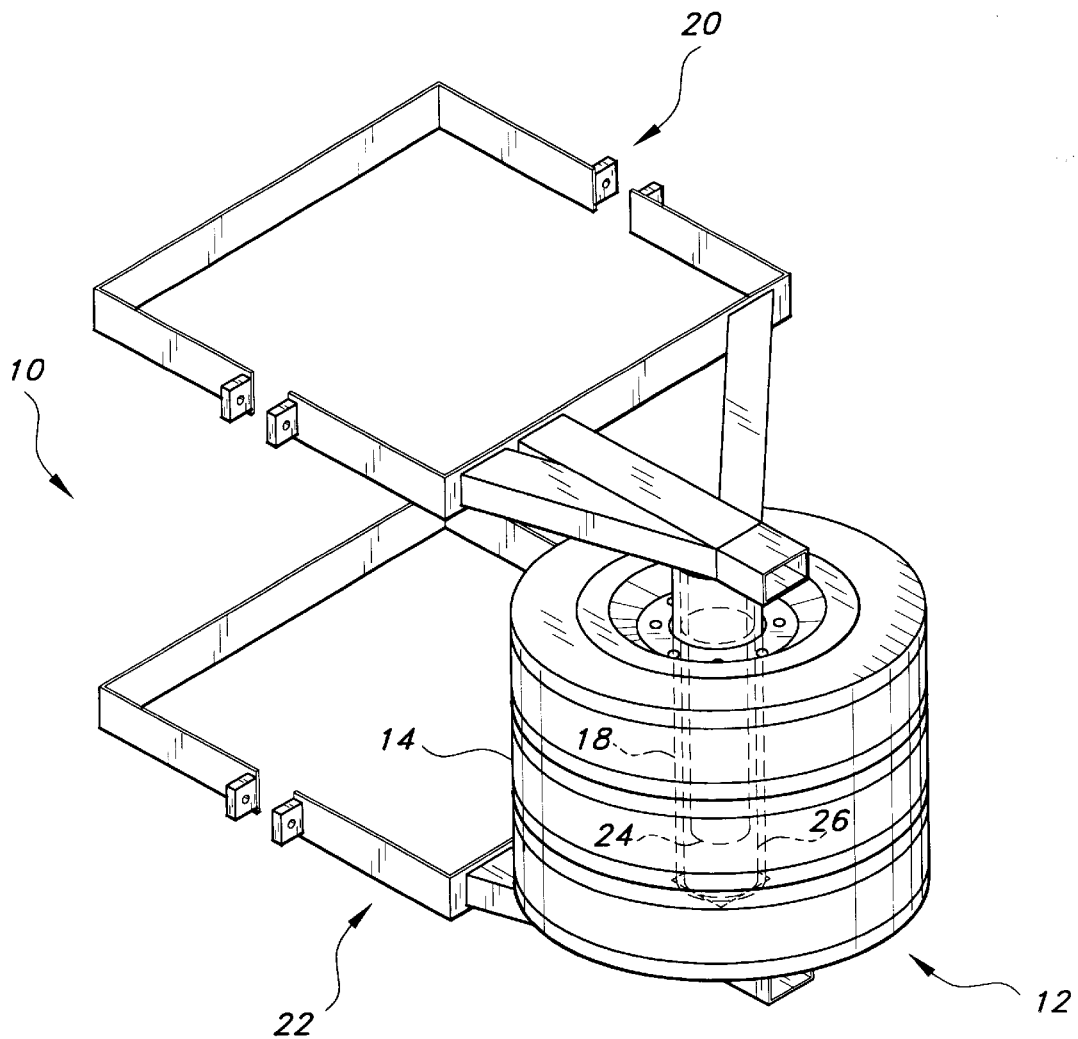
FIG. 2 is a perspective view of the present invention.

The upper frame 20 has a tubular protrusion 24, such as a pipe, extending downwardly. The lower frame 22 has a tubular protrusion 26 extending upwardly. The protrusions 24 and 26 are of different diameter such that they can be telescopically engaged and have outer diameters that are smaller than the inner diameter of the sleeve 18, such that the sleeve 18 fits over the protrusions 24 and 26 as seen in FIG. 2. FIG. 2 shows that the downwardly extending protrusion 24 fits into the upwardly extending protrusion 26; however, it is noted that the opposite arrangement, protrusion 26 fitting into protrusion 24 is contemplated by the invention and would also allow for the telescoping engagement.

The sleeve 18 is rotatably mounted on the protrusions 24 and 26. Energy from an object which strikes the column is dissipated by this rotation of the sleeve 18 relative to the protrusions 24 and 26, as well as the rotation of the tires 14 relative to the sleeve 18.

The nature of this system, i.e. the rotational dissipation of energy, allows for work to continue uninterrupted due to a glancing blow from an object, e.g. a vehicle, to a column. The absorption of energy is accomplished in a less destructive manner than with other apparatus, e.g. those having crumple zones. Further, the rotation of the tires 14 of the bumper 12 depends on the manner in which the bumper 12 is hit, and the tires 12 rotate such that the striking vehicle continues in its original direction.

The protrusion 24 of the upper frame 20 is extended from a forward bracket 28 by a perpendicular support 30 which is braced by braces 32 and 34 extending from the frame at either side of the support. The perpendicular support 30 and, therefore, the protrusion 24 may be closer to one end of the front surface 36 of the forward bracket 28. In this case (which is shown in the figures), the lengths of braces 32 and 34 are different. This orientation allows for the bumper 12 to be positioned where it is most useful, i.e. where the vehicle hits the column. Smaller tires 14 can be used because they only need to protect a specific corner of the column. The protrusion 26 of the lower frame 22 is extended and supported in an identical fashion. The same reference numerals have been used to represent identical parts in the frames 20 and 22.

It is to be understood that the attachment of the frames 20 and 22 to the column is identical for each frame and the following discussion of the upper frame 20 applies equally to the lower frame 22. The upper frame 20 has a removable rear bracket 38 detachably mounted by any well known attachment means such as a nut 40, a bolt 42, and a washer 44. This removable attachment allows for the easy adjustment of the frames 20 and 22 along a column. The adjustment of both frames 20 and 22 allows for the height of the bumper 12 to be varied on the column. The adjustment of one frame and the slidable relationship of the protrusions 24 and 26, allows for a variation of the distance between the frames 20 and 22 and a corresponding change in the number of tires 14. These adjustments may be needed depending on the type of equipment used around the column, i.e. a taller vehicle, or any other reason. The invention also contemplates the use of protrusions 24 and 26 or a sleeve 18 of any length.

Figure 3:
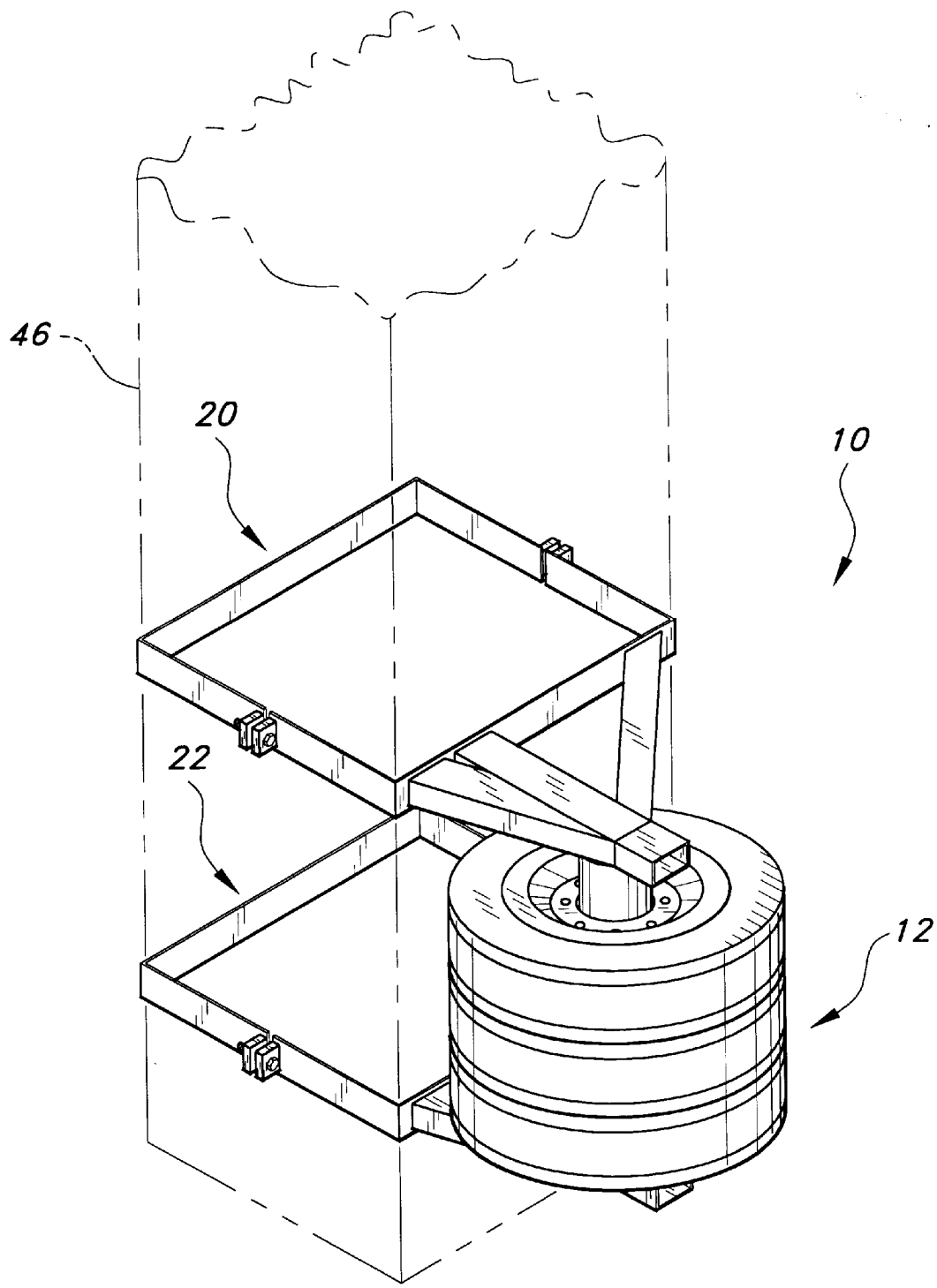
FIG. 3 is an environmental perspective view of the instant invention.

FIG. 3 shows the rear portions 38, 38 of the frames 20 and 22 attached to the front portions 28, 28 and encircling a column 46. It is noted that the invention contemplates protecting columns of other shapes, e.g. circular, in which case the shape of the rear portions 38, 38 and the front portions 28, 28 would be shaped differently.

It is to be understood that the present invention is not limited to the sole embodiment described above, but encompasses any and all embodiments within the scope of the following claims.

I claim:

1. A bumper and supporting frame assembly for columns comprising:

an upper frame having a downwardly extending tubular protrusion;

a lower frame having an upwardly extending tubular protrusion, each said tubular protrusion telescopically engages the other said tubular protrusion;

a sleeve rotatably mounted over each said tubular protrusion; and at least one bumper rotatably mounted on said sleeve;

wherein the energy from an object striking the assembly is dissipated by the rotation of said sleeve relative to each said protrusion and the rotation of said bumper with respect to said sleeve.

2. The assembly of claim 1 wherein each said frame has a front bracket removably attached to a rear bracket such that each said frame can be adjusted about a column.

3. The assembly of claim 2 wherein each said frame includes a support structure for each said tubular protrusion, each said support structure including a support extending perpendicularly from each said front bracket and a pair of angled braces.

4. The assembly of claim 1 wherein each said frame includes a support structure for each said tubular protrusion, each said support structure including a perpendicularly extending support and a pair of angled braces.

5. A bumper and supporting frame assembly for columns comprising:

a frame having an upwardly extending tubular protrusion;

a sleeve rotatably mounted over said tubular protrusion; and at least one bumper rotatably mounted on said sleeve;

wherein the energy from an object striking the assembly is dissipated by the rotation of said sleeve relative to said protrusion and the rotation of said bumper with respect to said sleeve.

6. The assembly of claim 5 wherein said frame has a front bracket removably attached to a rear bracket such that said frame can be adjusted about a column.

7. The assembly of claim 6 wherein said frame includes a support structure for said tubular protrusion, said support structure including a support extending perpendicularly from said front bracket and a pair of angled braces.

8. The assembly of claim 5 wherein said frame includes a support structure for said tubular protrusion, said support structure including a perpendicularly extending support and a pair of angled braces.

* * * * *